United States Patent
Bishop (10) Patent No.: US 7,237,362 B2
(45) Date of Patent: Jul. 3, 2007

(54) SAFE ROOM

(76) Inventor: Richard B. Bishop, 4734 Starboard Dr., Bradenton, FL (US) 34208

( * ) Notice: Subject to any disclaimer, the term of this patent is extended or adjusted under 35 U.S.C. 154(b) by 76 days.

(21) Appl. No.: 10/907,839

(22) Filed: Apr. 18, 2005

(65) Prior Publication Data

US 2006/0254165 A1    Nov. 16, 2006

(51) Int. Cl.
E04H 14/00 (2006.01)
(52) U.S. Cl. .............................. 52/79.2; 52/251; 52/106
(58) Field of Classification Search ................ 52/79.2, 52/251, 253, 106
See application file for complete search history.

(56) References Cited

U.S. PATENT DOCUMENTS

| | | | | |
|---|---|---|---|---|
| 3,201,907 | A * | 8/1965 | Henderson | 52/73 |
| 3,510,997 | A * | 5/1970 | Ratych | 52/79.2 |
| 3,558,095 | A * | 1/1971 | McNiel | 249/13 |
| 3,559,355 | A * | 2/1971 | Day, Jr. | 52/251 |
| 4,126,972 | A * | 11/1978 | Silen | 52/34 |
| 4,787,181 | A * | 11/1988 | Witten et al. | 52/79.1 |
| 5,081,805 | A * | 1/1992 | Jazzar | 52/79.2 |
| 5,205,943 | A * | 4/1993 | Jazzar | 249/27 |
| 5,481,837 | A * | 1/1996 | Minks, Jr. | 52/169.6 |
| 5,724,774 | A * | 3/1998 | Rooney | 52/79.5 |
| 6,003,271 | A | 12/1999 | Boyer et al. | |
| 6,098,357 | A * | 8/2000 | Franklin et al. | 52/223.7 |
| 6,334,278 | B1 | 1/2002 | Arnold | |
| 6,393,776 | B1 | 5/2002 | Waller et al. | |
| 6,415,557 | B1 | 7/2002 | McCalley | |
| 6,415,558 | B1 | 7/2002 | Cherry | |
| 6,438,906 | B1 | 8/2002 | Komarowski et al. | |
| 6,539,674 | B2 | 4/2003 | Arnold | |
| 6,658,799 | B1 * | 12/2003 | Stoodley | 52/79.2 |

* cited by examiner

Primary Examiner—Basil Katcheves
(74) Attorney, Agent, or Firm—Hahn Loeser & Parks LLP (57) ABSTRACT

A protective shelter and methods for manufacturing are disclosed. The shelter is capable of protecting individuals from significant wind velocities and other catastrophic damages that occur from dangerous conditions such as hurricanes, tornadoes and the like. Prior to the pouring the floor slab of a home, the shelter is fixedly attached to a plurality of supports that have been fixedly attached to a portion of the foundation of the home. When the floor slab is poured, enough concrete is poured to cover the supports up to essentially the top edges of the channel frame base rails to form the base of the shelter, thus incorporating and anchoring the shelter into the foundation of the home.

15 Claims, 5 Drawing Sheets

SAFE ROOM

TECHNICAL FIELD

The invention relates to a room to serve as a storm shelter for protecting an occupant against dangerous winds from hurricanes or tornadoes. More particularly, the invention relates to a prefabricated storm shelter that is incorporated into the design of a home and installed at the time of construction, and will be able to withstand significant wind velocities.

BACKGROUND OF THE INVENTION

For dangerous storms such as hurricanes and tornadoes, safe emergency shelters protect persons and property from harm and destruction. Hurricanes and tornadoes have been recorded with wind speeds of over 250 mph and tornadoes are capable of staying on the ground for over one hour. Flying debris can cause much injury and destruction. It is not uncommon that people are killed during these dangerous storms as well as causing millions of dollars in property damage. Regardless of catastrophic damages that occur from hurricanes and tornadoes, relatively little protection against them is provided because of variously prohibitive problems with present protection alternatives. Thus, there exists a need for storm shelters.

When hurricane type warnings are issued, some homeowners choose not to evacuate, but instead choose to stay in their residence and wait for the hurricane to dissipate in power and hoping the hurricane will move into a different area. When tornado type warnings are issued, there is usually very little time for individuals and families to go to community shelters. Also many community shelters do not allow for pets. The National Tornado Forum has announced an effort to encourage more people to build "safe rooms" (emergency shelters). The Federal Emergency Management Agency (FEMA) and the Federal National Mortgage Association (Fannie Mae) have programs and financing in place to encourage people to place their families in "safe room" or shelters. Evacuation that takes place in densely populated areas themselves can be dangerous due to traffic and weather.

It is desired to have a prefabricated shelter that is incorporated into the construction of a home and able to withstand significant wind velocities and other catastrophic damages that occur from hurricanes and tornadoes.

Further limitations and disadvantages of conventional, traditional, and prior proposed approaches will become apparent to one of skill in the art, through comparison of such systems and methods with the present invention as set forth in the remainder of the present application with reference to the drawings.

BRIEF SUMMARY OF THE INVENTION

An embodiment of the present invention comprises a protective shelter. The protective shelter includes a room formed from a plurality of sides and a roof to form an enclosed space. The shelter further includes at least one opening in one of the sides for a door, wherein the door provides access to the enclosed space of the room, at least two channel frame base rails, wherein each base rail has a pair of top edges and the base rails are incorporated into the bottom portions of at least two sides of the room, and a plurality of column supports each having a top portion and a bottom portion, wherein the ends of the base rails are fixedly attached to the top portions of the column supports and the bottom portion of the column support joins the shelter into the foundation of a home, and wherein concrete is poured to cover the supports up to essentially the top edges of a base channel frame to form the floor slab of the shelter and the home.

Another embodiment of the present invention comprises a protective shelter. The protective shelter includes a rectangular-shaped room formed from a front wall, a rear wall, two side walls and having a roof. The shelter further includes at least one door with optional location attached to at least one of the walls for allowing access to an interior of the room, at least two substantially u-shaped channels longer than the width of at least two of the walls, wherein the channels are incorporated into the bottom portions of at least two of the walls, and a plurality of columns each having a top portion and a bottom portion, wherein the ends of the substantially u-shaped channels are fixedly attached to the top portions of the columns and the bottom portion of the columns are tied into a foundation of a home. The floor slab is then poured and finished around the top of the column and around the u-shaped channel frame creating a water tight seal.

Another embodiment of the present invention comprises a method of incorporating and anchoring a protective shelter in a home. The method comprises constructing a protective shelter, wherein the shelter comprises a room formed from a plurality of sides and a roof to form an enclosed space, at least one opening in one of the sides for a door, wherein the door provides access to the enclosed space of the room, at least two channel frame base rails, wherein each base rail has a pair of top edges and the base rails are incorporated into the bottom portions of at least two sides of the room. The method further comprises placing a plurality of supports attached to a home foundation in a predetermined location of the home, placing the at least two base rails of the protective shelter on a plurality of supports, securing the at least two base rails to the supports, and pouring concrete to form a floor slab, wherein the concrete is poured to cover the supports up to essentially the top edges of the base rails to form a base of the shelter and a floor flab for the home.

Another embodiment of the present invention comprises a method of incorporating and attaching a protective shelter to an existing home. The method comprises constructing a protective shelter, wherein the shelter comprises a room formed from a plurality of sides and a roof to form an enclosed space, at least one opening in one of the sides for a door, wherein the door provides access to the enclosed space of the room, at least two channel frame base rails, wherein each base rail has a pair of top edges and the base rails are incorporated into the bottom portions of at least two sides of the room. The method further comprises placing a plurality of supports adjacent to a preexisting foundation of the home, placing the at least two base rails of the protective shelter on a plurality of supports, and creating a new foundation for the supports securing the at least two base rails to the supports and pouring concrete to form a secondary floor slab, wherein the concrete is poured to cover the preexisting foundation and the supports up to essentially the top edges of the base rails to form a base of the shelter and a floor slab for the home.

The present invention also provides a protective shelter. The shelter comprises an enclosure of pre-cast curable material having a plurality of sides and a roof, at least one opening in one of the sides to provide access to the inside of the enclosure. The shelter further includes at least two base rails each supporting at least one side of the enclosure, a plurality of reinforcing rods encased by the curable material, each rod attached at one end into a base rail and extending substantially the length of at least one side and for a length into the roof and a layer of curable material disposed around the base rails and forming a floor slab for the enclosure, the curable material of sufficient thickness to help secure the base rails to the floor slab along with tying to columns.

The advantages and novel features of the present invention, as well as details of illustrated embodiments thereof, will be more fully understood from the following description and drawings.

DETAILED DESCRIPTION OF THE INVENTION

Figure 1:
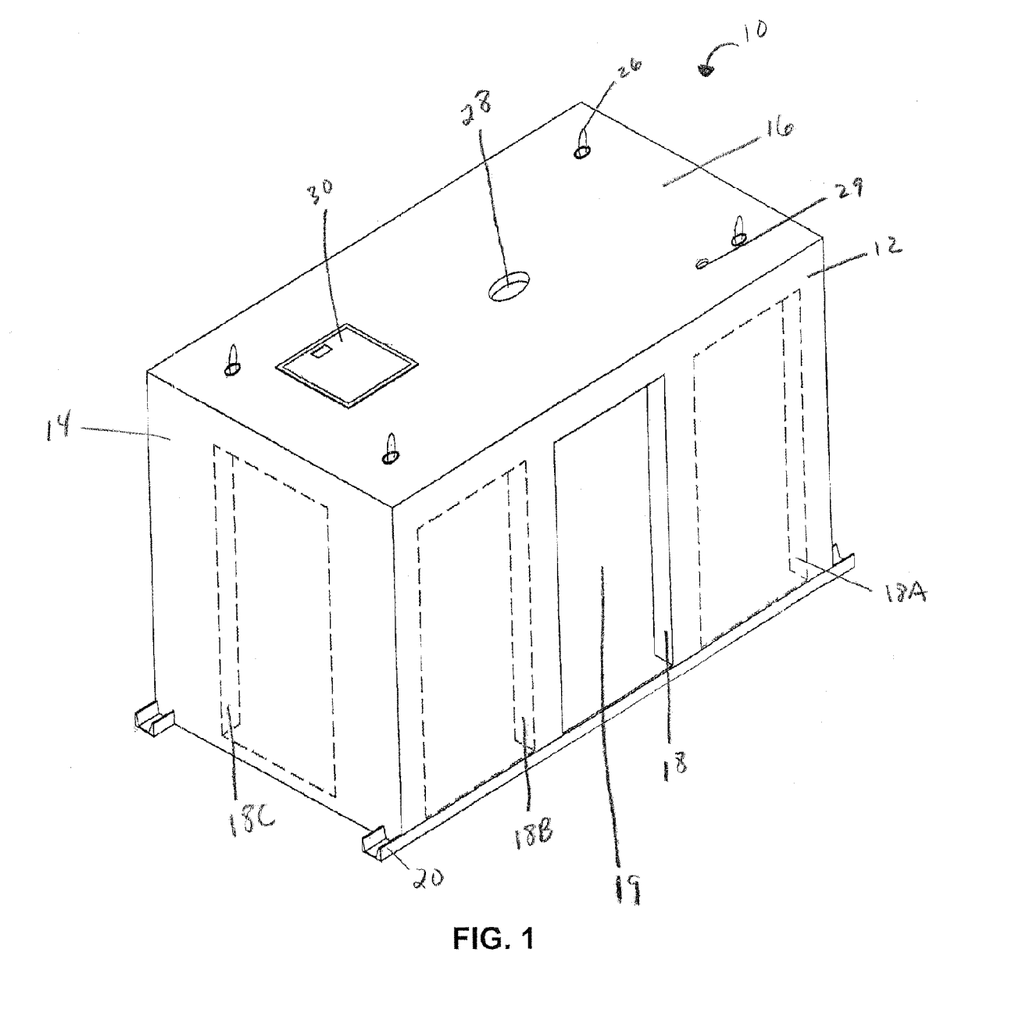
FIG. 1 is a perspective view of the shelter of the present invention.
Figure 2:
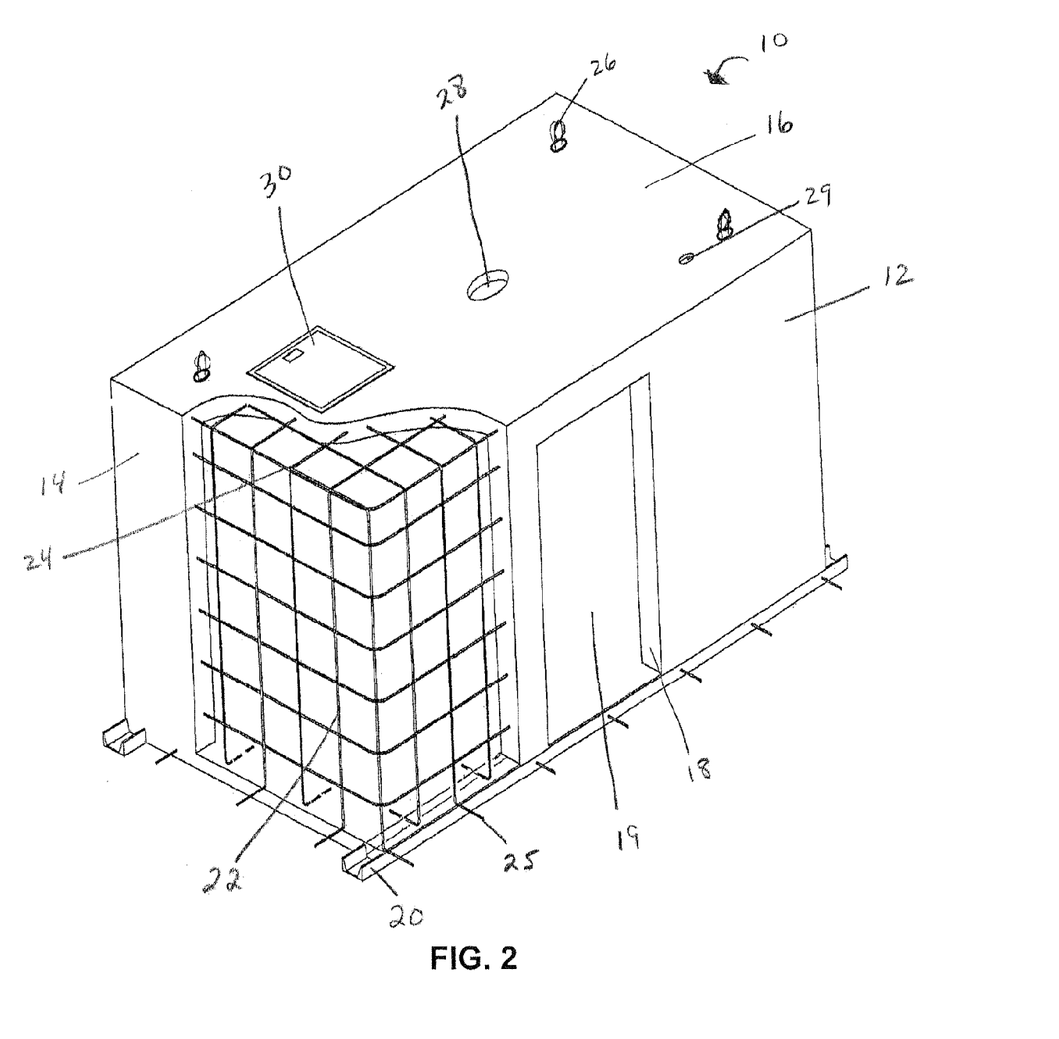
FIG. 2 is perspective view showing a partial cross section through the shelter of the present invention.

With reference now to the drawings in which like elements are denoted with the same numeral throughout the several views, and in particular with reference to FIGS. 1 and 2, a prefabricated protective shelter or "safe room" 10 is depicted. By prefabricated, it is meant that the complete shelter is pre-cast from reinforced concrete by pouring concrete or a structural equivalent into a cavity defined by an inner mold core and an outer surrounding mold shell. The prefabricated shelter can then be shipped to a desired location. Shelter 10 is shown as rectangular in shape and is comprised of a front wall 12, a back wall (not shown), a left side wall 14 and a right side wall (not shown) and a roof 16. Other shapes and configurations of shelter 10 are possible as well, in accordance with alternative embodiments of the present invention. Other size and dimensional characteristics are also contemplated and within the scope of the invention, as shelter 10 may be specifically configured to fit within a home requiring different configurations.

The walls 12, 14 and roof 16 are preferably made from a durable material, preferably reinforced concrete. Any other suitable material that satisfies requirements set by regulatory bodies for "safe rooms" may also be used to pre-cast the walls and roof. At least one wall, such as front wall 12 has at least one opening 18 for a door through which entry into an enclosed space 19 within shelter 10 is possible. Opening 18 may also be located in other preferred locations on shelter 10 as shown by 18A-C.

The thickness of the walls may be varied to suit the particular building in which the shelter is to be used and to reduce the overall cost of the shelter. In one embodiment of the present invention, the walls are approximately 6" thick near the base of shelter 10 and are optionally tapered to approximately 5" thick where the walls meet roof 16 of shelter 10. By tapering the thickness of the walls, the volume of concrete required to manufacture shelter 10 is reduced thereby reducing the overall cost and weight of the shelter.

FIG. 2 is an exemplary illustration of an embodiment of the present invention wherein concrete walls 12, 14 and roof 16 of shelter 10 are reinforced. A plurality of connected reinforcing rods 22 and 24 are utilized in a grid-like fashion for the construction of shelter 10 thereby fortifying roof 16. It is known that because of extreme differences in pressure between the inside of a house and the outside low pressure area of a hurricane or tornado that there may be an outward push of pressure from the house. The plurality of connected reinforcing rods 22 and 24 enable roof 16 to withstand these pressure differences and maintain its integrity with shelter 10. Near the bottom portion of shelter 10 there are at least some reinforcing rods 22 that terminate with an end portion 25 protruding through holes located at specified distances in the internal and external sides of channel frame base rail 20. The holes are either pre-drilled into channel frame base rail 20 prior to delivery to the construction site or are drilled into channel frame base rail 20 directly onsite. In general, each reinforcing rod 22 is attached at one end into base rail 20 and extends substantially the length of at least one side of walls and for a length into roof 16.

In accordance with an embodiment of the present invention, at least two channeled base rails 20, preferably taking the form of substantially unshaped channels, are incorporated into the base of shelter 10. Each base rail 20 has a pair of top edges. During the construction of shelter 10, each base rail 20 is fixedly incorporated into the bottom portions of at least two walls of shelter 10. For example, as detailed in FIGS. 1 and 2, base rails 20 are incorporated into front wall 12, rear wall and the four corners of shelter 10. As discussed in more detail in a later section, end portions 25 of each base rail 20 play a vital role in reinforcing shelter 10 when the concrete slab foundation is poured.

To facilitate transporting shelter 10, roof 16 may be provided with a plurality of "lifting eyes" 26 as seen in FIGS. 1 and 2. Each lifting eye 26 acts as an anchor for a crane or other suitable piece of equipment to hoist shelter 10 onto a truck or position shelter 10 on a footing at a construction site.

In accordance with an embodiment of the present invention, optional openings 28, 29 or 30 may also be provided through roof 16. For example, opening 28 is designed to permit heating, ventilation and air conditioning (HVAC) ductwork to be installed within shelter 10. Opening 29 can be designed to permit electrical conduits to be installed within the enclosed space 19 of shelter 10. It is contemplated that a single opening could accommodate HVAC and electrical conduits may be preferred for certain applications. Opening 30 can be cast to provide an area in which a hinged escape door is provided and serves as an additional exit route in case opening 18 is blocked by debris resulting from the effects of a tornado, hurricane or other hazard. Other openings may also be designed to permit the installation of plumbing inside shelter 10.

Figure 3:
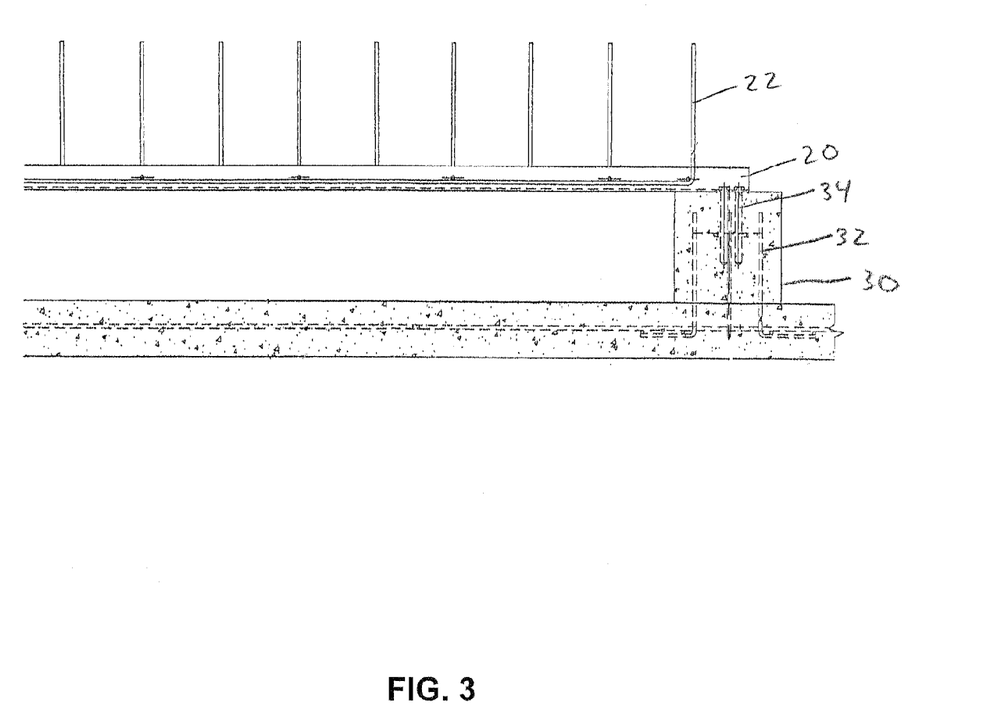
FIG. 3 is a cross section through the shelter of the present invention fixedly attached to a support.
Figure 4:
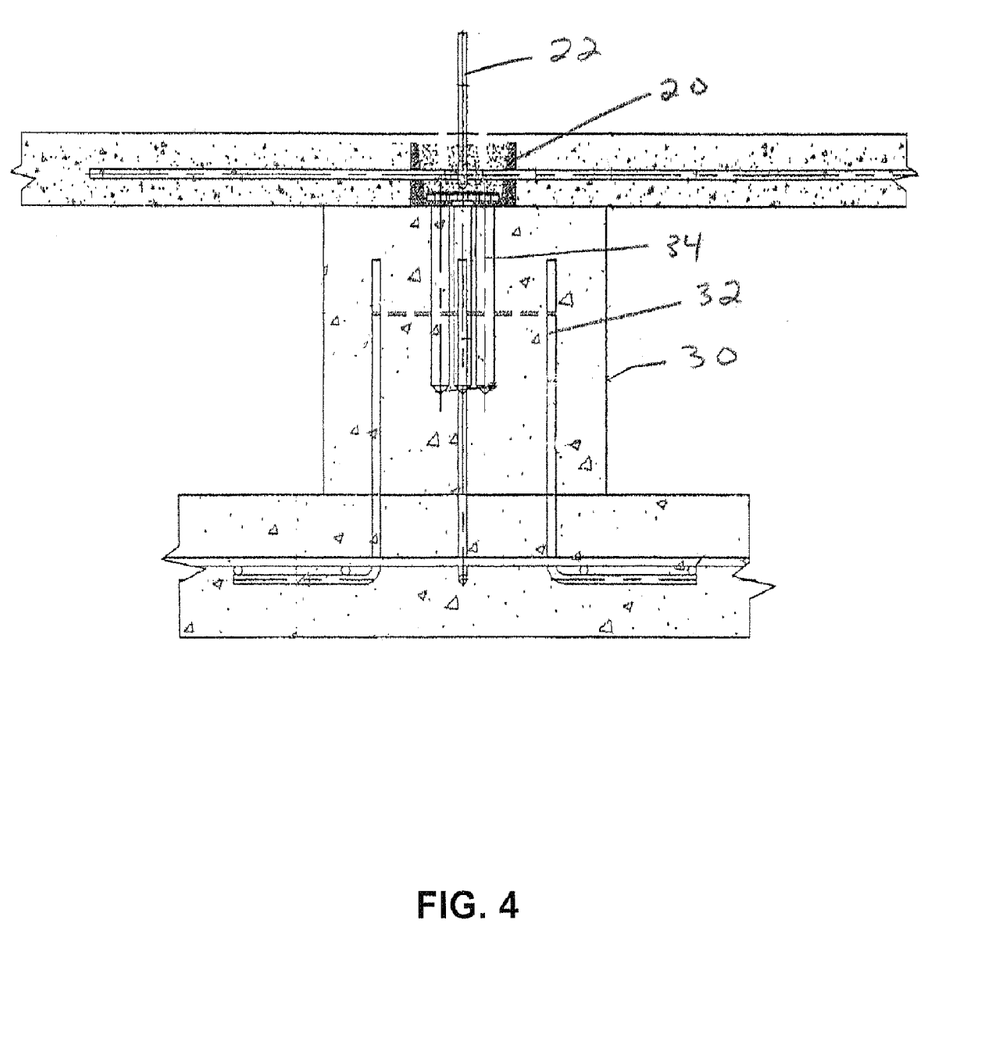
FIG. 4 is an expanded view of FIG. 3.

FIGS. 3 and 4 are an exemplary illustration of an embodiment of the present invention wherein shelter 10 is sustained on a plurality of supports 30. In its preferred form, support 30 is in the form of a round column at least 16" in height, but can also take the shape of a rectangle or any other suitable configuration. In accordance with an embodiment of the present invention, a plurality of supports 30 are placed at predetermined locations when the home is built, preferably in the building foundation, i.e. a footer, so that a plurality of reinforcing rods 32 are used to secure supports 30. Support 30 is manufactured from poured concrete or any other suitable material that is capable of supporting shelter 10. Shelter 10 is placed on supports 30 such that the ends of base rails 20 are resting on the top portion of supports 30. Base rails 20 are fixedly attached to supports 30, preferably through the use of a plurality of fasteners 34. An adhesive can be used in conjunction with fasteners 34 to provide additional strength to fasteners 34. As an example, ¾ inch All-Thread Simpson bolts and an epoxy adhesive are used to secure base rails 20 to support 30.

In accordance with the present invention, safe room 10 is generally installed at a construction site as follows. For a new home foundation, a perimeter footing is first poured followed by the construction of the block stemwalls. A plurality of supports 30, preferably at least four, are located and then fixedly attached to the building foundation. Plumbing and electrical components are optionally installed in the home. Next, shelter 10 is placed on supports 30 so that the ends of base rails 20 are fixedly attached to supports 30. A concrete floor slab is then poured around shelter 10 so that the concrete covers the supports 30 and up to essentially above the top edges of base rails 20 to form the floor of the shelter. End portions 25 of reinforcing rods 22 that protrude through the internal and external sides of base rail 20 provide an extra level of reinforcement once the poured concrete hardens. In this fashion, shelter 10 becomes incorporated and anchored into the foundation and floor slab of the home, thus being able to withstand significant wind velocities and other catastrophic damages that occur from hurricanes and tornadoes. After the floor slab has been poured and set, the home is finished in the normal manner wherein the walls and roof are constructed. The invention is designed to support roof trusses, and they may be tied to it.

In accordance with an embodiment of the present invention, shelter 10 generally installed at an existing home site as follows. First, a plurality of supports 30, preferably at least four, are fixedly attached adjacent to the preexisting foundation of the home. Next shelter 10 is placed on supports 30 so that the ends of the base rails 20 can be fixedly attached to the supports 30. A secondary concrete floor slab is then poured around shelter 10 so that the concrete covers the preexisting foundation and supports 30 and goes up to the top edges of base rails 20 to form the floor of the shelter. End portions 25 of reinforcing rods 22 that protrude through the internal and external sides of base rail 20, as seen in FIG. 2, provide an extra level of reinforcement once the poured concrete hardens. In this fashion, shelter 10 becomes incorporated and anchored into the foundation and floor slab of the home, thus being able to withstand significant wind velocities and other catastrophic damages that occur from hurricanes and tornadoes.

Figure 5:
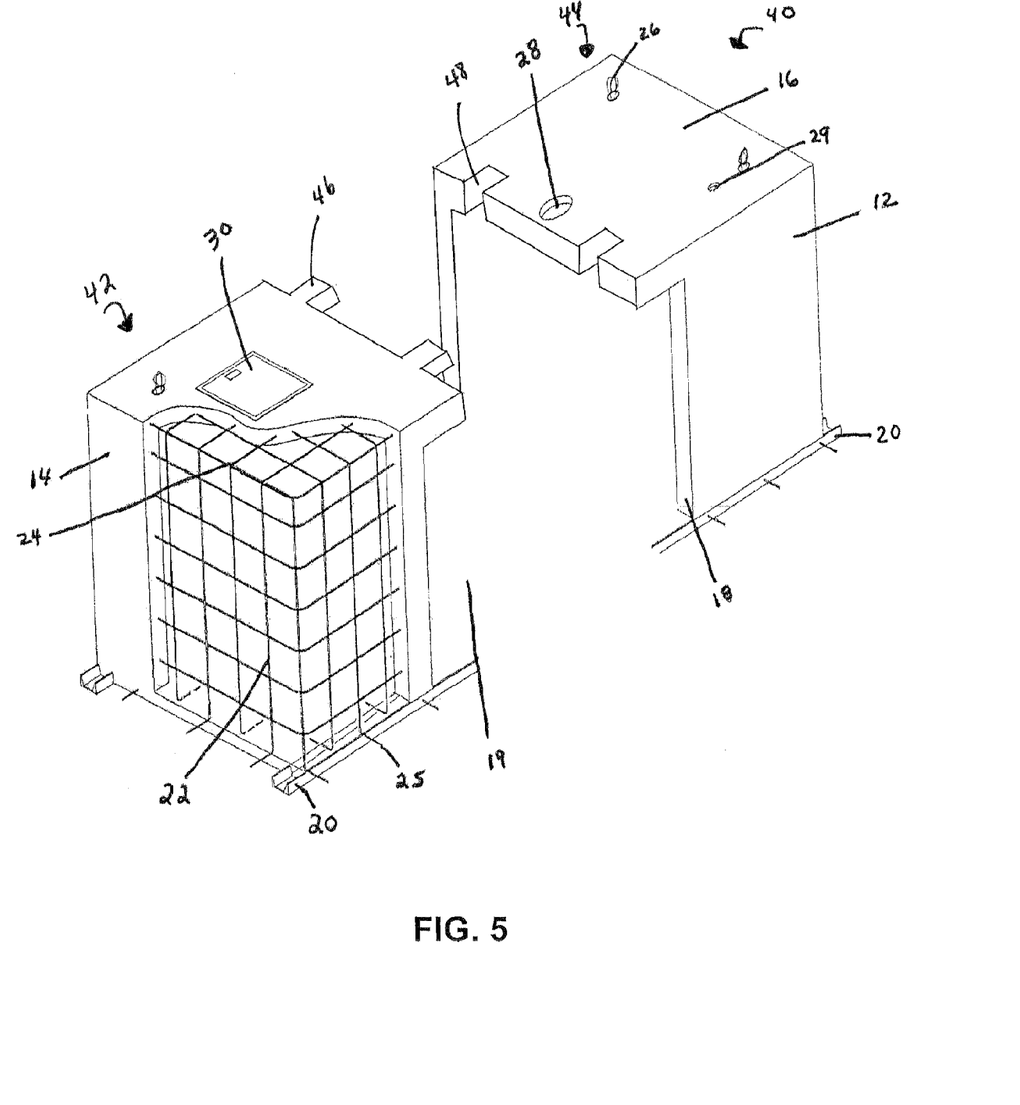
FIG. 5 is a perspective view of the shelter of the present invention in a modular form.

In accordance with an embodiment of the present invention, shelter 40 is modular, wherein at least two sections are joined to form a single unit. As seen in FIG. 5, shelter 40 includes separate sections 42 and 44. Section 42 has a plurality of outwardly extending ridges 46 formed with roof 16 and section 44 has a plurality of grooves 48 formed in roof 16. All of the other features of shelter 10, as described in relation to FIGS. 1 and 2, are also found in FIG. 5. To form a single unit of shelter 10, ridges 46 of section 42 mate with grooves 48 of section 44. Other shapes and configurations of ridges 46 and grooves 48 are possible as well, in accordance with alternative embodiments of the present invention. Other interlocking means, for example a hook anchored into roof 16 in section 42 and a receiving loop anchored into roof 16 in section 44, are also contemplated and within the scope of the invention. Next, base rail portions 20 of sections 42 and 44 are coupled together. Rail portions 20 can be welded, bolted or connected together by other means known to one skilled in the art.

The modular shelter 40 is generally assembled at a construction site as follows. For a new home having a foundation, a perimeter footing is first poured followed by the construction of the stemwalls. A plurality of supports 30, preferably at least four, are located and then fixedly attached to the building foundation. Plumbing and electrical components are optionally installed in the home. Next, sections 42 and 44 of shelter 40 are combined by mating ridges 46 of section 42 mate with grooves 48 of section 44 followed by the coupling of rail portions 20 of sections 42 and 44. Shelter 40 is then placed on supports 30 so that the ends of base rails 20 are fixedly attached to supports 30. A concrete floor slab is then poured around shelter 10 so that the concrete covers the supports 30 and up to essentially the top edges of base rails 20 to form the base of the shelter. End portions 25 of reinforcing rods 22 that protrude through the internal and external sides of base rail 20 provide an extra level of reinforcement once the poured concrete hardens. In this fashion, shelter 40 becomes incorporated and anchored into the floor slab of the home, thus being able to withstand significant wind velocities and other catastrophic damages that occur from hurricanes and tornadoes. After the floor slab has been poured and set, the home is finished in the normal manner wherein the walls and roof are constructed.

When not protecting individuals from catastrophic damages that occur from tornadoes, hurricanes, and other hazards, it is envisioned that the shelter can serve other purposes. The protective shelter can be dry walled and finished as any other room in the home and used accordingly. For example, the shelter can be used as a storage room, a walk-in closet, a vault, a hobby room, a sewing room or a wine storage room.

In summary, certain embodiments of the present invention comprise prefabricated protective shelters, also known as safe rooms, that are able to withstand significant wind velocities and other catastrophic damages that occur from hurricanes and tornadoes. The protective shelters are incorporated into the foundation of a home. This is accomplished by first fixedly attaching the shelters to a plurality of supports which are part of the foundation and then pouring concrete to cover the supports up to the top edges of the base rails of the shelters thus incorporating the shelters into the foundation of the home.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A protective shelter comprising:
   a room having a plurality of sides and a roof to form an enclosed space,
   wherein a pair of opposed first and second sides and roof of the shelter are reinforced with a first plurality of individual reinforcing rods, wherein each of the reinforcing rods of the first and second sides and roof have a first bend of about 90° near a first base portion of the firt side of the shelter, ascend to a second bend of about 90° near a first roof portion of the first side of the shelter, travel along a portion of the roof to a third bend of about 90° near a second roof portion of the second side of the shelter, and descend to a fourth bend of about 90° near a second base portion of the second side of the shelter and wherein a pair of opposed third and fourth sides and the roof of the shelter are reinforced with a second plurality of individual reinforcing rods, wherein each of the reinforcing rods of the third and fourth sides and roof have a first bend of about 90° near a first base portion of the third side of the shelter, ascend substantially to a second bend of about 90° near a first roof portion of the third side of the shelter, travel along a portion of the roof to a third bend of about 90° near a second roof portion of the fourth side of the shelter, and descend to a fourth bend of about 90° near a second base portion of the fourth side of the shelter, and wherein the first plurality of individual reinforcing rods of the first and second sides are substantially parallel to the second plurality of reinforcing rods of the third and fourth sides and the first plurality of individual reinforcing rods are substantially orthogonal to the second plurality of individual reinforcing rods in the roof of the shelter;

at least one opening in one of the sides for a door, wherein the door provides access to the enclosed space of the room;

at least two channel frame base rails, wherein each base rail has a pair of top edges and a first end and a second end and the base rails are incorporated into bottom portions of at least two sides of the room;

a plurality of column supports each having a top portion and a bottom portion that is tied into and part of the house foundation, wherein the ends of the base rails are fixedly attached to the top portions of the column supports and the bottom portions of the column supports join the shelter into the foundation of a home, and wherein concrete is poured to cover the supports up to essentially the top edges of the base rails to form a floor slab of the shelter, wherein at least one of the reinforcing rods terminate with an end portion protruding through a base rail and into the floor slab both inside and outside the shelter room.

2. The protective shelter of claim 1, wherein the poured concrete joins the shelter into a foundation of a home.

3. The protective shelter of claim 1, wherein the shelter is made from a durable material.

4. The protective shelter of claim 3, wherein the durable material is steel-reinforced concrete.

5. The protective shelter of claim 1, wherein the channeled base rails are substantially u-shaped.

6. The protective shelter of claim 1, wherein the end portion of the reinforcing rods protrudes through the base rails providing additional reinforcement when the poured concrete hardens.

7. The protective shelter of claim 1, wherein a plurality of fasteners secure the base rails to the supports, thereby securing the entire shelter.

8. A protective shelter comprising:

a rectangular-shaped room having a front wall, a rear wall, two side walls and having a roof, wherein the front wall, rear wall and roof of the shelter are reinforced with a first plurality of reinforcing rods, wherein each of the reinforcing rods of the front wall, rear wall and roof have a first bend of about 90° near a first base portion of the front wall of the shelter, ascend to a second bend of about 90° near a first roof portion of the front wall of the shelter, travel along a portion of the roof to a third bend of about 90° near a second roof portion of the rear wall of the shelter, and descend to a fourth bend of about 90° near a second base portion of the rear wall of the shelter and wherein a first side wall, a second side wall and the roof of the shelter are reinforced with a second plurality of individual reinforcing rods, wherein each of the reinforcing rods of the first side wall, second side wall and roof have a first bend of about 90° near a first base portion of the first side wall of the shelter, ascend substantially to a second bend of about 90° near a first roof portion of the first side wall of the shelter, travel along a portion of the roof to a third bend of about 90° near a second roof portion of the second side wall of the shelter, and descend to a fourth bend of about 90° near a second base portion of the second side wall of the shelter, and wherein the first plurality of individual reinforcing rods of the front wall and rear wall are substantially parallel to the second plurality of reinforcing rods of the first side wall and second side wall, and the first plurality of individual reinforcing rods are substantially orthogonal to the second plurality of individual reinforcing rods in the roof of the shelter at least one door attached to at least one of the walls for allowing access to an interior of the room;

at least two substantially u-shaped channels where each channel has a first end and a second end and is longer than the width of at least two of the walls, wherein the channels are incorporated into bottom portions of the at least two of the walls; and a plurality of columns each having a top portion and a bottom portion, wherein the ends of the substantially u-shaped channels are fixedly attached to the top portion of the columns and the bottom portion of the columns are attached to a foundation of a home, and wherein a curable material covers the columns up to essentially the top of the substantially u-shaped channels to form a base of the shelter, wherein at least one of the reinforcing rods terminate with an end portion protruding through a portion of one of the substantially u-shaped channels and into the base of the shelter.

9. The protective shelter of claim 8, wherein the curable material and columns join the shelter into the foundation of the home.

10. The protective shelter of claim 8, wherein the shelter is pre-cast from a durable material.

11. The protective shelter of claim 10, wherein the durable material is reinforced concrete.

12. The protective shelter of claim 8, wherein the end portion of the reinforcing rod that protrudes through a portion of one of the substantially u-shaped channels provides additional reinforcement when the curable material hardens.

13. A method of incorporating and anchoring a protective shelter in a new home, the method comprising:

constructing a protective shelter, wherein the shelter comprises a room having a plurality of sides and a roof to form an enclosed space, wherein a pair of opposed first and second sides and roof of the shelter are reinforced with a first plurality of individual reinforcing rods, wherein each of the reinforcing rods of the first and second sides and roof have a first bend of about 90° near a first base portion of the first side of the shelter, ascend to a second bend of about 90° near a first roof portion of the first side of the shelter, travel along a portion of the roof to a third bend of about 90° near a second roof portion of the second side of the shelter, and descend to a fourth bend of about 90° near a second base portion of the second side of the shelter and wherein a pair of opposed third and fourth sides and the roof of the shelter are reinforced with a second plurality of individual reinforcing rods, wherein each of the reinforcing rods of the third and fourth sides and roof have a first bend of about 90° near a first base portion of the third side of the shelter, ascend substantially to a second bend of about 90° near a first roof portion of the third side of the shelter, travel along a portion of the roof to a third bend of about 90° near a second roof portion of the fourth side of the shelter, and descend to a fourth bend of about 90° near a second base portion of the fourth side of the shelter, and wherein the first plurality of individual reinforcing rods of the first and second sides are substantially parallel to the second plurality of reinforcing rods of the third and fourth sidea and the first plurality of individual reinforcing rods are substantially orthogonal to the second plurality of individual reinforcing rods in the roof of the shelter at least one opening in one of the sides for a door, wherein the door provides access to the enclosed space of the room, at least two channel frame base rails wherein at least one of the reinforcing rods terminate with an end portion protruding through the base rails, wherein each base rail has a pair of top edges and the base rails are incorporated into bottom portions of at least two sides of the room;

placing a plurality of supports in a predetermined location of the home attached to a home foundation;

placing the at least two base rails of the protective shelter on a plurality of supports;

securing the at least two base rails to the supports; and pouring concrete to form a floor slab, wherein the concrete is poured to cover the supports up to essentially the top edges of the base rails incorporating the end portions of the reinforcing rods protruding through the base rails into the concrete to form a base of the shelter and a floor slab for the home.

14. A method of incorporating and attaching a protective shelter to an existing home, the method comprising:

constructing a protective shelter, wherein the shelter comprises a room having a plurality of sides and a roof to form an enclosed space, wherein a pair of opposed first and second sides and roof of the shelter are reinforced with a first plurality of individual reinforcing rods, wherein each of the reinforcing rods of the first and second sides and roof have a first bend of about 90° near a first base portion of the first side of the shelter, ascend to a second bend of about 90° near a first roof portion of the first side of the shelter, travel along a portion of the roof to a third bend of about 90° near a second roof portion of the second side of the shelter, and descend to a fourth bend of about 90° near a second base portion of the second side of the shelter and wherein a pair of opposed third and fourth sides and the roof of the shelter are reinforced with a second plurality of individual reinforcing rods, wherein each of the reinforcing rods of the third and fourth sides and roof have a first bend of about 90° near a first base portion of the third side of the shelter, ascend substantially to a second bend of about 90° near a first roof portion of the third side of the shelter, travel along a portion of the roof to a third bend of about 90° near a second roof portion of the fourth side of the shelter, and descend to a fourth bend of about 90° near a second base portion of the fourth side of the shelter, and wherein the first plurality of individual reinforcing rods of the first and second sideds are substantially parallel to the second plurality of reinforcing rods of the third and fourth sides and the first plurality of individual reinforcing rods are substantially orthogonal to the second plurality of individual reinforcing rods in the roof of the shelter at least one opening in one of the sides for a door, wherein the door provides access to the enclosed space of the room, at least two channel frame base rails, wherein each base rail has a pair of top edges and the base rails are incorporated into the bottom portions of at least two sides of the room;

placing a plurality of supports adjacent to a preexisting foundation of the home;

placing the at least two base rails of the protective shelter on a plurality of supports, wherein at least one of the reinforcing rods terminate with an end portion protruding through a base rail, securing the at least two base rails to the supports; and pouring concrete to form a secondary floor slab, wherein the concrete is poured to cover the preexisting foundation and the supports up to essentially the top edges of the base rails including the end portion of the reinforcing rod protruding through the base rail to form a base of the shelter and a floor slab for the home.

15. A protective shelter comprising:

an enclosure of pre-cast curable material having a plurality of sides and a roof, wherein a pair of opposed first and second sides and roof of the shelter are reinforced with a first plurality of individual reinforcing rods, wherein each of the reinforcing rods of the first and second sides and roof have a first bend of about 90° near a first base portion of the first side of the shelter, ascend to a second bend of about 90° near a first roof portion of the first side of the shelter, travel along a portion of the roof to a third bend of about 90° near a second roof portion of the second side of the shelter, and descend to a fourth bend of about 90° near a second base portion of the second side of the shelter and wherein a pair of opposed third and fourth sides and the roof of the shelter are reinforced with a second plurality of individual reinforcing rods, wherein each of the reinforcing rods of the third and fourth sides and roof have a first bend of about 90° near a first base portion of the third side of the shelter, ascend substantially to a second bend of about 90° near a first roof portion of the third side of the shelter, travel along a portion of the roof to a third bend of about 90° near a second roof portion of the fourth side of the shelter, and descend to a fourth bend of about 90° near a second base portion of the fourth side of the shelter, and wherein the first plurality of individual reinforcing rods of the first and second sides are substantially parallel to the second plurality of reinforcing rods of the third and fourth sides and the first plurality of individual reinforcing rods are substantially orthogonal to the second plurality of individual reinforcing rods in the roof of the shelter;

at least one opening in one of the sides to provide access to the inside of the enclosure;

at least two base rails each supporting at least one side of the enclosure; and a layer of curable material disposed around the base rails and forming a floor slab for the enclosure, the curable material of sufficient thickness to secure the base rails to the floor slab and wherein at least one of the reinforcing rods terminate with an end portion protruding through a base rail and into the floor slab.

* * * * *